Aug. 16, 1960    M. MAUL    2,949,225
SUMMARY CARD PUNCHES
Filed Nov. 27, 1953    4 Sheets-Sheet 1
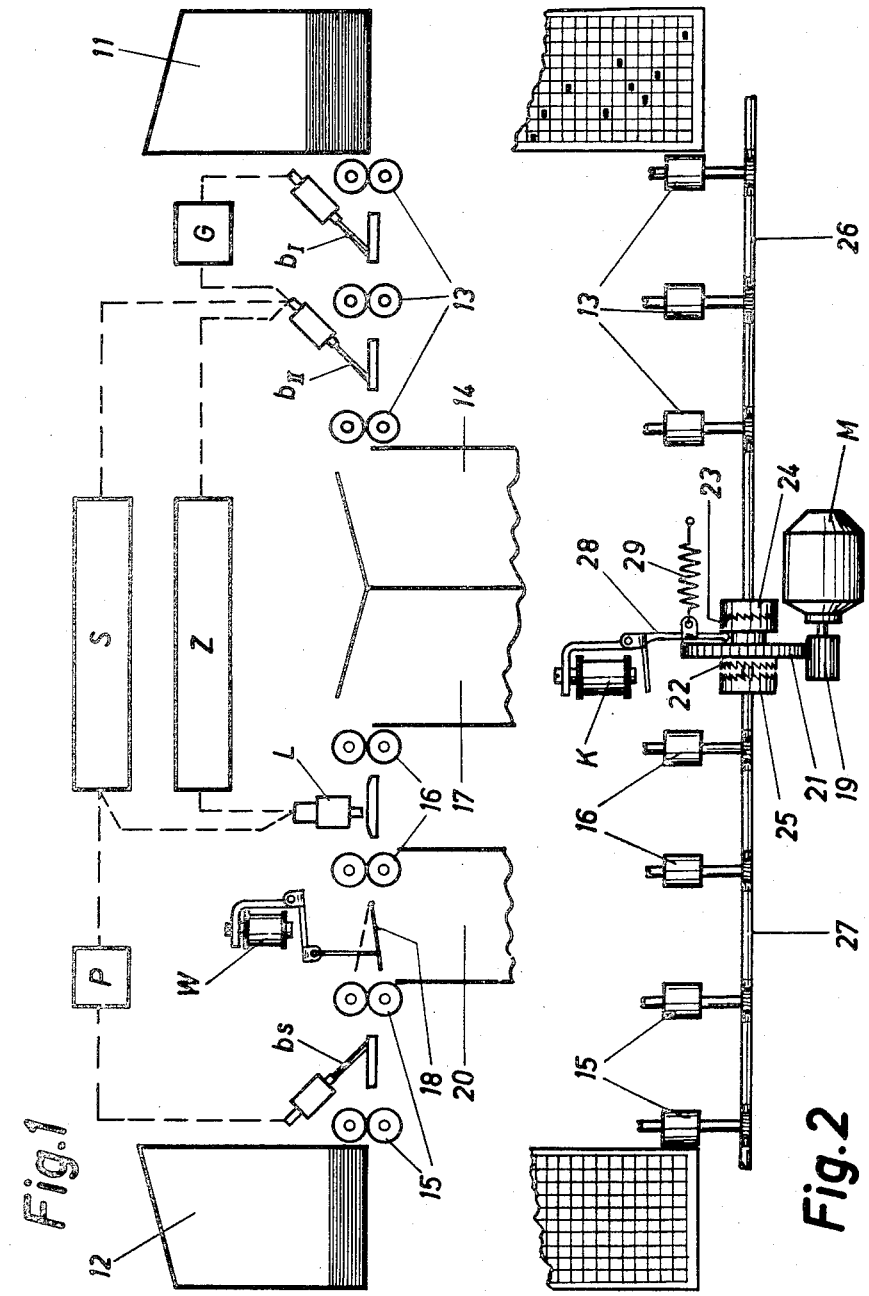
Inventor:
Michael Maul
BY:

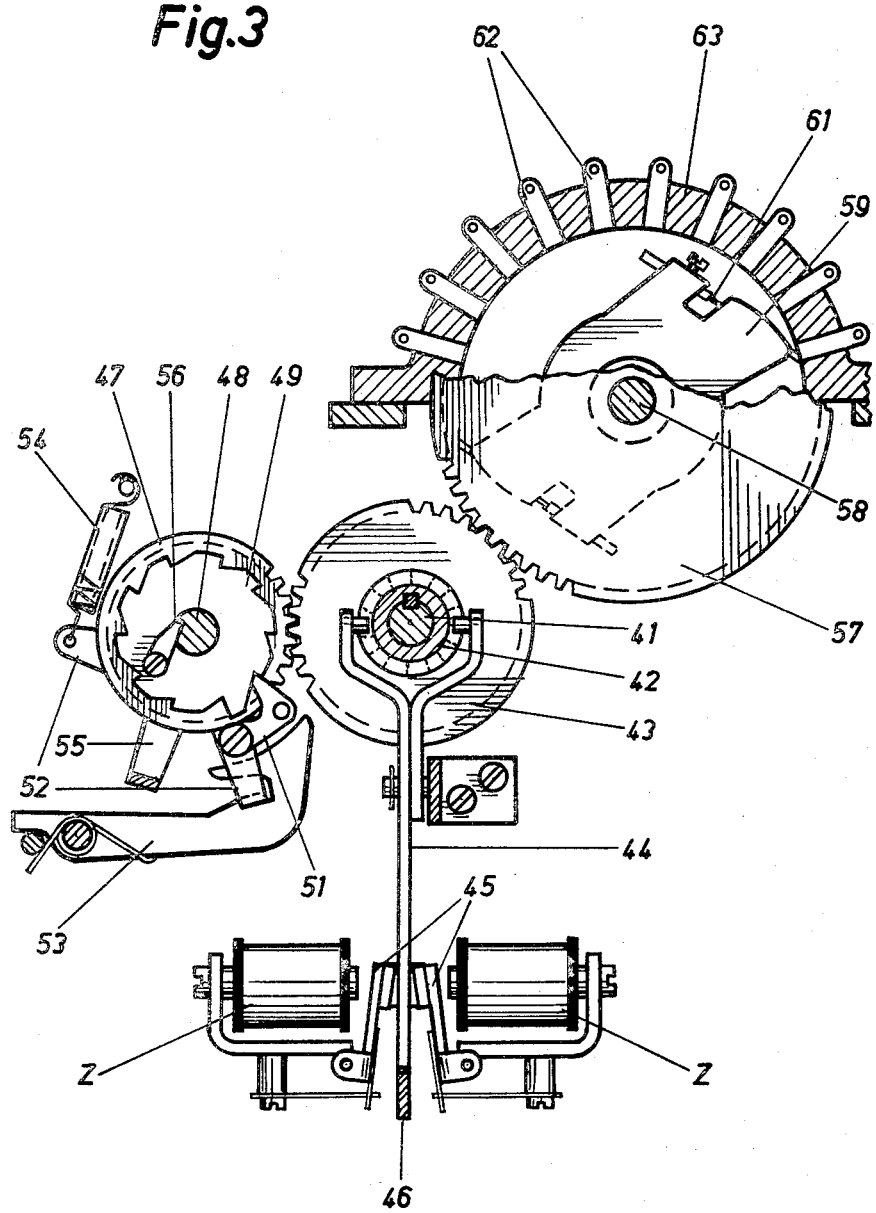

United States Patent Office 2,949,225
Patented Aug. 16, 1960

2,949,225
SUMMARY CARD PUNCHES

Michael Maul, 88 Penzendorferst, Schwabach, near Nurnberg, Germany

Filed Nov. 27, 1953, Ser. No. 394,828

Claims priority, application Germany Dec. 5, 1952

15 Claims. (Cl. 235—61.7)

In record card controlled summary card punches it is known to prepare, under the control of item cards, summary cards indicating the total of the data of a group of item cards. The item cards are sorted according to the group designation numbers and the designation number derived from a group of item cards is also transferred to the summary card to which the total is transferred.

Since in record cards usually different item fields are indicated such as, for instance, quantities, amounts, commissions, deductions etc., a corresponding large number of accumulators is required. The number of accumulators is further increased if the balances of the items have to be obtained and if minor and major totals are taken.

The present invention provides a small and less expensive summary card punch by providing a smaller number of accumulators but nevertheless does the work of the larger machines of the prior art during several runs of the cards through the machine. Thus, such a machine is particularly suited for smaller business enterprises.

The objects and advantages of the invention will become particularly obvious by the following example in which only a single accumulator is assumed although in the practical embodiment more than one accumulator may be provided if this should be found advisable.

For example, assuming only one accumulator, in the first run of the item cards through the machine, the quantities of each group are accumulated in the accumulator and upon a group change the total of the quantities of the respective group is punched in the associated summary card. Since this summary card is a blank card not only the total is punched into the card but also the respective group designation number which is derived in any one of the known manners from the group of item cards.

Now, if the summary cards are to be punched also with the totals of the amounts indicated in the item cards, the item cards and summary cards are run a second time through the machine. The amounts are accumulated in the single accumulator and upon a group change, the respective summary card is punched with the total of the amounts. Since, however, in this second run the group designation is already punched in the summary card, it must not be punched again. However, the group number of the group of item cards should be compared with the previously punched group number of the summary card in order to assure that the total of the amounts is punched in the proper summary card.

It is one of the main objects of the present invention to provide a machine of the type referred to which can be manually set to either punch in the first run of the cards the bank summary cards with the group designation, or to compare in a further run the previously punched group designations of the summary cards and the group of item cards, while omitting punching of the group number.

Various possibilities exist which permit operation of the machine in any one of the two ways, i.e., either for comparing the group designations in the further runs while omitting group number punching, or for punching summary cards in the first run with a group designation in addition to a total. In one embodiment described in the following specification, a manually settable selector is provided, by means of which the dependency of the designation punching on the group agreement between item cards and summary cards is eliminated; at the same time, a punching device for the punching of the group data into the summary card is set to be directly or indirectly controlled by the group data of the item cards.

Such manual setting can be avoided in another preferred embodiment, so that in the first card run, the perforation of the group data and the associated totals is effected automatically whereas in further runs—in addition to total punching—only comparing of the already punched group designations in the two kinds of cards takes place. The setting to one of the two manners of operation is in this instance automatically derived from the fact that the blank summary card is not yet provided with a group designation punching. Generally the disagreement between the group data of summary cards and item cards consists in that the group perforations are different. In the first card run, however, this disagreement is a particular one insofar that in the summary card no group perforations are provided at all. In spite of the existing disagreement this particular kind of disagreement permits to control the setting of the machine.

The comparison between the group data of the item cards and those of the summary cards can take place in such a way that the group perforations of both kinds of cards become directly effective. However, in the present embodiment there is preferably employed a storage device for the group data of the item cards. This storage device can then directly coact with an analyzing device provided between the supply magazine for the summary cards and the summary card punching device and serving for the analysis of the group number field of the summary cards.

Further features of the invention will become apparent from the following description of preferred embodiments. Two preferred embodiments of the invention will now be described in connection with the accompanying drawings. It will, however, also be seen that the particular features of the two embodiments may also be comprised in a single machine, if this should be desirable for particular reasons. Known devices are only symbolically indicated in the drawings.

Fig. 1 shows diagrammatically the construction of the machine from which may particularly be seen the arrangement of the magazines, of the analyzing brushes and of the punching device.

Fig. 2 shows the driving diagram for the feed rollers.

Fig. 3 shows a section through an accumulator as it is employed in the machine herein described.

Figure 4:
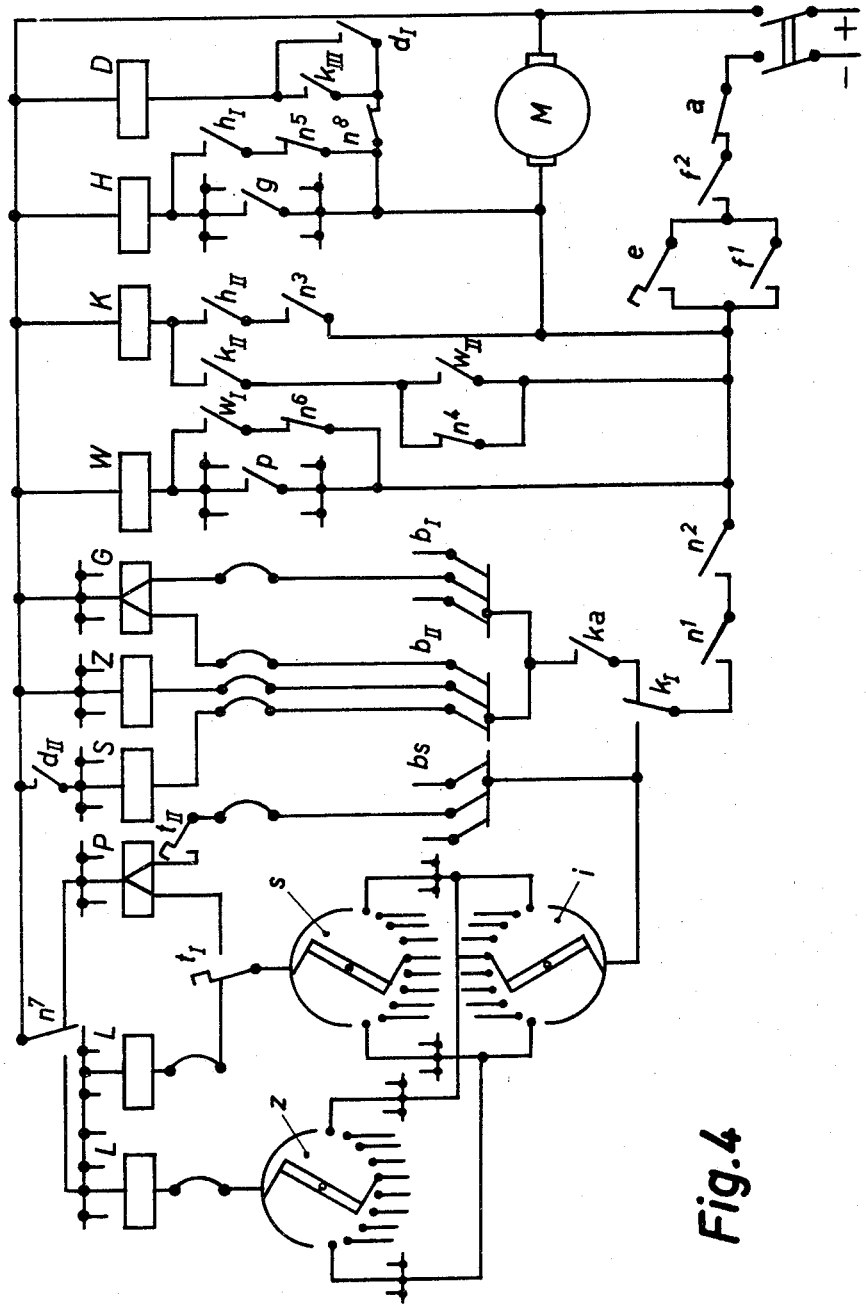
Fig. 4 shows the wiring diagram of the first mentioned embodiment of the invention.

The item cards are deposited in the magazine 11 and the magazine 12 will receive either the blank cards (in the first card run) or already perforated summary cards (in the second and the following card run) in which further totals are to be punched. The item cards are fed by the feed rollers 13 past the brushes $b_I$ and $b_{II}$ (one being provided for each card column) to the receiver 14. In the group fields, the brushes $b_I$ coact with the brushes $b_{II}$ through a known group control device. Moreover, the entries from the group field are transferred through the brushes $b_{II}$ to a storage device S and from the amount field to an accumulator Z. If the group control device G determines the end of the feeding of a group of item cards, the item card feed means will be disconnected and the summary card feed means will be switched on, whereupon the transfer of the total from the accumulator Z upon the summary card is effected by means of the punching device L. If blank cards are concerned, simultaneously the group data will be simultaneously transferred from the storage device S to the punching device L. Accordingly, the total and the group data are simultaneously derived from the accumulator and the storage device and are punched into the summary card. The feeding of the cards to the punching device and subsequently to the receiving pocket 17 is effected by means of the feed rollers 15 and 16. The actuator magnets of the punches may either control the punches directly or they serve in a known manner only for the control of the punch selectors.

If, however, in the magazine 12 there are cards which have already been punched, in which only further totals are to be entered, the verification device P will be switched on, comparing through brushes $bs$ the group number of the summary card with the group number of the preceding group of item cards, said group number having been transferred to the storage device. The punching device of the storing elements is at the same time disconnected. If the group numbers are alike, the summary card will be fed by the card deflector 18 to the feed rollers 16 under the punching device L, whereupon the total which is in the accumulator is transferred to the card. If, however, the verification device P determines a different group number, a current circuit is established through the magnet W which is energized and moves the card deflector 18 into the upper position (indicated in dash lines). In this way the summary card is deposited in the pocket 20.

Now, summary cards are successively supplied to the brushes $bs$ until the group number of a card agrees with that contained in the storage device. In this case the current circuit through the magnet W is again interrupted so that the latter drops and the deflector 18 returns to its normal position. These operations take place if, for instance, a wrong summary card is detected which skipped and would be deposited in the magazine 20. If, however, the other case occurs, in which there is no summary card for a group of item cards, all remaining cards will run into the magazine 20 on account of the disagreement with the just computed group of items. Since now all following summary cards run into the magazine 20 and since moreover there is no advance of item cards, the operator can recognize therefrom the existing error in the card sequencee and may stop the machine or discontinue depositing cards after clearance of the magazine 12. From the group number in the uppermost summary card in the pocket 17 and the group number in the lowermost summary card in the pocket 20 it can easily be determined which summary card is missing. Accordingly, this method of detection is simpler than as if the machine would be stopped immediately upon detection of the disagreement in which latter instance the wrong summary card would remain under the brushes $bs$ and would have to be manually removed from the card path by means of the roller drive.

The feed of the item cards by means of rollers 13 and the feed of the summary cards by means of rollers 15 and 16 operate alternatively. As long as item cards are analyzed, the summary card feed does not operate and during the analysis or perforation respectively, of the summary card the item card feed does not operate. Selective actuation of one or other feed means is effected by the clutch magnet K. The feed rollers are driven through the pinion 19 and the gear 21 by means of motor M. The gear 21 is axially displaceable together with the dog clutches 22 and 23 seated on gear 21. Hence, the dog clutch 23 is held in engagement with the dog clutch 24 by the armature 28 and the spring 29 and so that the drive is connected to the shaft 26 which carries worms driving through worm wheels the feed rollers 13 for the item card feed. If, however, the magnet K is energized it will attract its bracket armature 28 which moves the gear 21 to the left (Fig. 2). The dog clutch 23 is disengaged from the dog clutch 24 and the dog clutch 22 is engaged with the dog clutch 25 upon the shaft 27 having worm portions which drive through worm wheels the feed rollers 15 and 16 for the summary card feed. The control of the clutch magnet K will be explained later on when the wiring will be described.

A known accumulator will be briefly described here of a form which may be used for the machine described herein. It is an accumulator as used in a similar manner in the known Hollerith machines.

The shaft 41 rotates in the clockwise direction synchronously with the card movement. On the shaft, the clutches 42 are mounted for axial movement while being held against rotation relative to the shaft. The clutches 42 are held disengaged from the gear 43 by the levers 44, said gear being freely rotatable upon the shaft 41 but held against axial movement thereon. If one of the magnets Z is energized, it attracts its armature 45 thereby releasing lever 44 and causing the clutch 42 to be pressed by a spring against the gear 43. Energization of the magnet Z depends upon whether the associated brush $b_{II}$ is located on a hole in the card and thereby closes the current circuit through the magnet. When the analysis of the card is finished all released levers 44 are again restored to their initial position by means of the bar 46 and thereupon the clutches are disengaged.

The rotating movement of the gear 43, thus effected, is transferred to the gear 47 and the gear 57. The gear 47 is connected to the ratchet wheel 49 and is rotatably mounted upon the shaft 48. Ratchet wheel 49, pawl 51, lever 52, 53, spring 54 and yoke 55 serve in a known manner for the tens transfer and for zeroizing.

If the accumulator is to be reset, the shaft 48 is rotated once between two operation cycles and in counter-clockwise direction. Coupling of the shaft 48 to the drive is effected under control of magnet D through a known one-revolution clutch, said magnet being referred to later on in the description of the wiring. In the shaft there is a recess into which the pawl 56 drops according to the setting of the associated denominational accumulator element, thereby taking the latter to the zero position.

Upon the gear 57 there is provided the insulating body 59 which holds the brush 61. According to the accumulator setting brush 61 slides over a commutator 63 having the contact lamellae 62. The opposite brush 61 slides always over a contact path which is not illustrated in detail. According to the setting of the accumulator element the brush 61 is set to any one of the contact lamellae 62, thereby permitting reading of the accumulator setting, as will be described later on.

Wiring

In the illustration of the wiring for the summary punch a simplified method has been chosen, as generally used in the art of communication. All contacts designated by $n$ and index are cyclically operated by means of cams of the gearing (cam contacts).

If the two supply magazines (Fig. 4) are filled with cards, the associated known magazine contacts $f^1$ and $f^2$ are closed. If the machine is now switched on the motor M receives current through the contacts $a$, $f^2$, $f^1$. The machine starts running and feeds the first item card to the brushes $b_I$. When the first card reaches the brushes $b_I$ the cam contact $n^2$ closes as long as the hole positions are passing under the analyzing means. The card lever contact $ka$ closes at the same time. The cam contact $n^1$ closes temporarily when the first hole position is under the analyzing device. Now, current flows from the contact $f^1$ through the contacts $n^2$, $n^1$, $k_I$, $ka$ through the brush $b_I$ which is on a hole, and the right hand winding of the group control relay G to positive. Simultaneously, current flows from the card lever contact $ka$ through the brushes $b_{II}$, and through the left hand winding of the group control relay G to positive. The group control relays are constructed as differential relays and respond if current flows only through one of the two windings.

Since there is not yet a card under the brushes $b_{II}$, current can flow through all brushes $b_{II}$ while the circuit through some of the brushes $b_I$ is interrupted by the first item card. Therefore, the windings of the group control relays do not compensate each other so that one or a plurality of these relays will respond and close their contacts $g$ so that the relay H receives current and responds and closes its two contacts $h_I$ and $h_{II}$.

A holding circuit is established to the cam contact $n^5$ by the closure of the contact $h_I$, so that the relay H remains energized even when the contacts $g$ return to their normal position. This energization is also maintained, independently of the analysis of the following hole positions. Due to the closure of contact $h_{II}$ the current circuit for the clutch magnet K is prepared.

Before the card is advanced to bring the second hole position under the row of brushes $b_I$ the cam contact $n^1$ opens. It is accordingly the purpose of the contact $n^1$ to interrupt the current circuit through the brushes before the latter are again lifted by the card whereby sparking at the brushes is avoided. On analysis of the next position the contact $n^1$ closes temporarily. For each hole position these cycles will be repeated. When all the positions have passed under the brushes $b_I$ the cam contact $n^3$ closes temporarily (only once per card analysis), thereby establishing the current circuit to the clutch magnet K through the closed contact $h_{II}$. The latter responds, disconnects the item card feed and engages the summary card feed. Due to the responding of the clutch magnet K its contact $k_I$ is shifted and the contacts $k_{II}$ and $k_{III}$ are closed. Due to the closure of the contact $k_{III}$, the relay D receives current through the cam contact $n^8$ and closes its two contacts $d_I$ and $d_{II}$. The contact $d_I$ establishes a holding circuit for the relay D while the contact $d_{II}$ is closing the current circuit through the storage device. Thereby the result is attained that the group number is entered into the storage device only once, namely from the first item card. The cam contact $n^8$ opens temporarily at the end of each item card cycle. Thus, the responding of the relay D takes place each time when the summary card cycle has come to an end and when a new item card cycle is beginning. At the same time the storage device or the accumulators, respectively, must be zeroized. Therefore, the relay D may also be used for starting the cleaning operations so that at the beginning of each summing up the accumulators and the storage device are cleared. The displaced contact $k_I$ interrupts the current circuit to the brushes $b_I$ and $b_{II}$ and a circuit established to the brushes $bs$ and to the analyzing devices of the accumulators and storing mechanism. At first, this has not yet any influence upon the operation of the machine since no items have yet been computed in the accumulators. Due to the closure of the contact $k_{II}$ a holding circuit is established to the clutch magnet K through the cam contact $n^4$.

The first summary card is now fed to the punching device. However, shortly before the first summary card reaches the punching device the came contact $n^4$ is temporarily opened, thereby interrupting the holding circuit to the clutch magnet K so that the latter becomes deenergized and its contacts $k_I$ and $k_{II}$ return to their normal positions. Simultaneously therewith the item card feed is started and the summary card feed is stopped again. During the feed of the summary cards, the cam contact $n^5$, which is controlled in dependence of the shaft 27, has temporarily opened, thereby interrupting the holding circuit for the relay H and causing the same to become deenergized.

The first item card is now fed to the analyzing brushes $b_{II}$. Simultaneously the second item card is fed to the analyzing brushes $b_I$. If both item cards have the same group number, current will flow simultaneously through both windings of the group control relays upon the subsequent analysis of both cards so that the group control relays cannot respond. Moreover, the accumulator magnets Z are controlled by the brushes $b_{II}$.

The analyzing cycles and the entering into the accumulators is continued until group change is detected. In this instance, the last item card of the previously analyzed group is under the brushes $b_{II}$. The card now following belongs to the next group. Now, one or a plurality of the group control relays G will respond. The latter close as described above. At the end of this analyzing cycle the clutch magnet K is energized, as described above, so that the total taking operation is initiated. The card feed for the item cards is stopped and the summary card feed is started instead. Due to the responding of the magnet K the contact $k_I$ is shifted.

During the following card cycle the known impulse transformer $i$ rotates synchronously with the movement of the summary card under the punching device, only one impulse transformer being provided for all accumulator and storing elements. According to the individual settings of the accumulator and storing elements, a time differential current impulse is sent through the commutators $s$ or $z$, respectively, to the punching magnets L which are energized and which will punch the card in the respective position of the respective column. While the summary card is under the punching device, the contact $n^7$, which is under the control of a cam provided upon the shaft 27, has been shifted to connect the punching device so that the current may flow over the punching magnets. Perforation can be effected by the punch magnets or the same may control punch selectors in a generally known manner, whereas the punching force is supplied by a punch drive.

If instead of the blank cards, already punched cards are deposited in the magazine 12—which means in the second or in a later card passage—a lever must be actuated by hand, said lever shifting the contact $t_I$ and closing the contact $t_{II}$.

Thereby, the verification device P is included in the current circuit of the machine and the punching device for the group number is disconnected. If the summary card is now moving past the brushes $bs$, the latter will analyze the group perforation of the card and according to that perforation current will flow through the right hand winding of the verification relays P which are formed as differential relays similar to the group control relays G. The left hand winding of the relay P receives its current impulses from the impulse transformer $i$ through the analyzing commutators $s$ of the storage device. If in the storage device there is stored the group number of the card, current will flow simultaneously through both windings of the verification relays P so that the same cannot respond. Accordingly, as described above, the card may continue running to the punching device which in a similar manner, as described in the foregoing, takes the total from the accumulator and punches it into the card thereby avoiding the repeated perforation of the group number.

If, however, the summary card has a different group number than that of the last group of item cards being in the storage device, current will not flow simultaneously through both windings of the relays P so that one or a plurality of these relays P respond and close their contacts $p$. The latter establish a current circuit through the deflector magnet W, which displaces the card deflector so that the summary card is fed to the receiving pocket 20 and not to the punching device. Owing to the response of the magnet W, the contact $w_I$ has been closed at the same time, said contact establishing a holding circuit to the magnets W so that the contacts $p$ can open again.

At the end of each summary card cycle, the cam contact $n^4$ opens temporarily, this having no influence, however, upon the operation of the machine since at that time said contact is short-circuited by the contact $w_{II}$. Accordingly, the summary card feed remains energized for a further card cycle. Some time later also the contact $n^6$ opens temporarily thereby interrupting the holding circuit to the magnet W and causing the same to drop. If, now, in the next summary card cycle agreement of the group numbers in the storage device and the summary card has been determined, the magnet W will not respond and the current circuit to the clutch magnet K will be interrupted by the contact $n^4$ at the end of the summary card cycle, thereby causing the magnet K to drop and to reconnect the item card feed.

The contacts $f^1$ and $f^2$ are provided under the supply magazines and they are closed as long as there are cards in the same. If there are no cards in a magazine the associated contact will open and interrupt the current circuit through the whole machine. This is also the purpose of the contact $a$ which opens as soon as one of the three receiving pockets 15, 17 and 20 is filled with cards.

Figure 5:
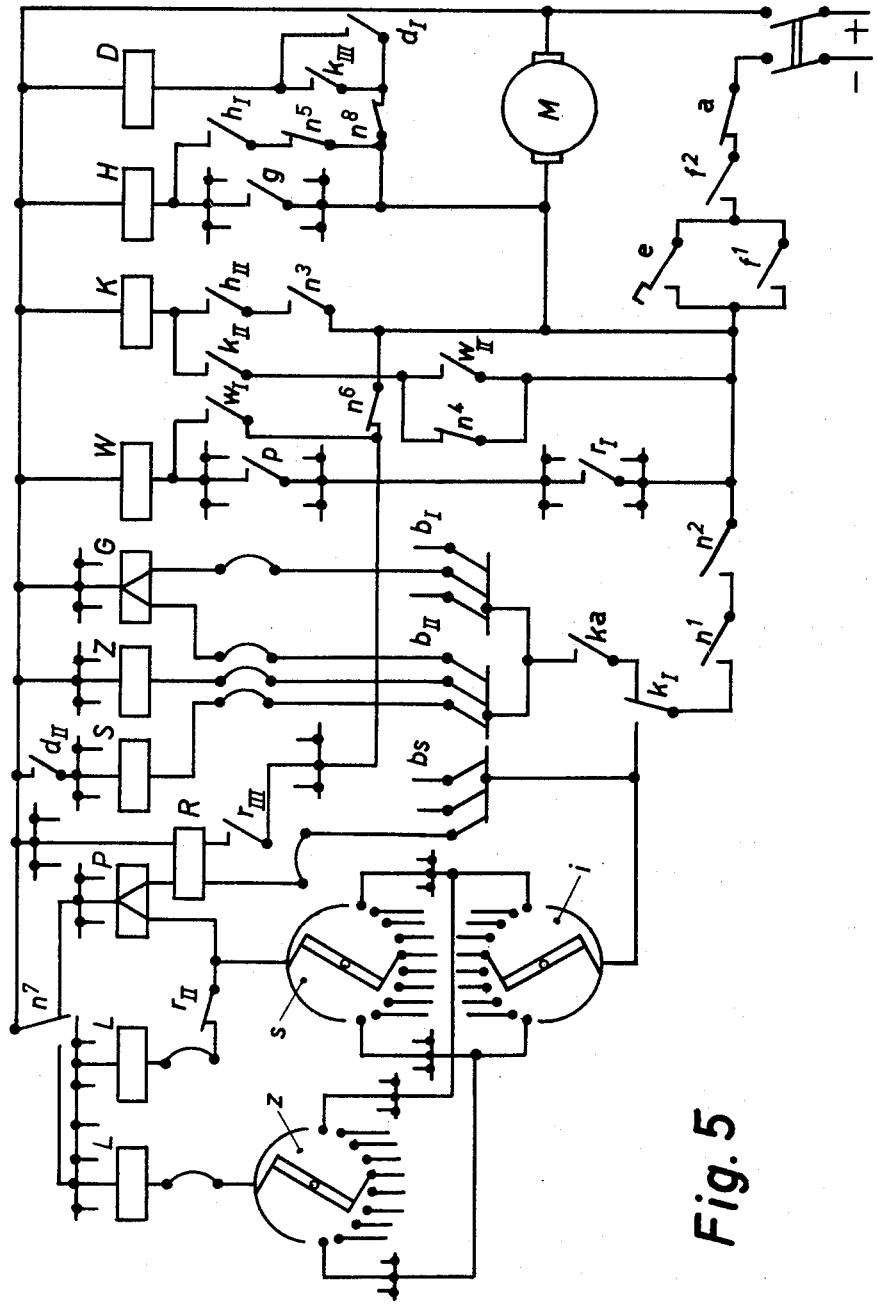
Fig. 5 shows the wiring diagram of the preferred second mentioned embodiment.

Fig. 5 shows the wiring diagram of the second embodiment in which, as mentione above, the blank cards inserted as summary cards are recognized by the machine itself and are brought to the punching device where punching of the group number as well as of the total of items takes place. The construction of the wiring diagram is similar to that described above for Fig. 4. The difference between the two diagrams consists only in the omission of the two key contacts $t_I$ and $t_{II}$ and in the inclusion of the relay R with its three contacts $r_I$, $r_{II}$ and $r_{III}$. This relay R lies in the verification current circuit for the summary cards and it has the task to determine whether there are perforations in the field of the group numbers or not. For each column of the group field there is provided one relay R. The other parts of the wiring diagram in Fig. 5 are identical with those in Fig. 4 so that only the operation of the relay R in the diagram needs to be explained.

If a blank card is analyzed as summary card by the brushes $bs$, the brushes $bs$ will not be permitted to receive current during the entire analyzing period because there is no perforation in the card. Accordingly, none of the relays R can respond and the contacts $r$ remain in their illustrated position. In this case, the current circuit through the contacts $r_I$ to the deflector magnets W remains interrupted so that, in spite of the response of the P-relays, the deflector magnet W cannot respond on account of the disagreement between the group number of the item card and that of the summary card. Accordingly, the summary card will not be deposited into the receiving pocket for erroneously interpolated summary cards but it will be advanced to the punching device where punching of the group number as well as of the total of items takes place.

If, however, a card punched with the group number is analyzed by the summary card brushes $bs$, one or a plurality of the relays R will respond, namely those in the associated columns of which there is a hole. The relays R close their contacts $r_I$ and $r_{III}$ and open their contacts $r_{II}$ owing to the response of the relays R. Due to the closure of the contacts $r_I$, the current circuit to the deflector magnet W is prepared. If there is now agreement between the group number of the item cards and that of the summary card, the current circuit will nevertheless remain interrupted by the contacts $p$ since the verification relay P cannot respond. If there is, however, no agreement between the group numbers, one or a plurality of the contacts $p$ will close, so that the current circuit to the deflector magnet W is established, said deflector magnet responding and raising the card deflector 18 (Fig. 1) so that the summary card which has just been analyzed is fed to the receiving pocket 20 for the wrong cards.

If a blank card has been determined by the machine as summary card, the relays R as has just been described will not be energized and their contacts $r_{II}$ will maintain the current circuit to the punch magnets L for the group number. If, however, a summary card with the right group number has been analyzed, all relays R in the associated columns will have responded and opened their contacts $r_{II}$ so that the current circuit to the punch magnets for the group number remains interrupted. Accordingly, in the columns in which there is already a group perforation no second perforation will occur. The relay R must remain energized for the whole punching cycle in order to interrupt the current circuit to the punching magnets L. Since, however, only a short current impulse can be sent through the relay R by means of the brushes $bs$, a holding circuit has been provided through a second coil of the relay R which is closed by the contact $r_{III}$. This holding circuit is interrupted by the cam contact $n^6$ which opens temporarily at the end of a summary card cycle.

I claim:

1. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means for punching totals of groups of items into summary cards and for punching group designations into said summary cards; summary card feeding means for feeding summary cards to said summary punch means, each summary card being associated with one group of item cards; a group control mechanism for detecting a change in group designations of fed item cards, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; and control means including an analyzing device for said summary cards, said control means cooperating with said group control mechanism and controlling said summary punch means so that, upon agreement of the group designation of a group of fed item cards with the group designation of the summary card fed after all item cards of a respective group have been fed, said summary punch means punches the total of a number of items of the respective group of item cards on the summary card, said control means including a means movable to an operative position for manifesting an error when the group designation of the summary card does not agree with the group designation of the respective group of item cards, said control means effecting punching of the group designation by said summary card punch means on a summary card only if there is no group designation already punched in the respective summary card.

2. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means and analyzer means for punching totals of groups of items into summary cards and for punching group designations into said summary cards; summary card feeding means for feeding summary cards to said summary punch means, each summary card being associated with one group of item cards; a group control mechanism for detecting a change in group designations of fed item cards, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; control means including an analyzing device for said summary cards, said control means co-operating with said group control mechanism and controlling said summary punch means so that, upon agreement of the group designation of a group of fed item cards with the group designation of the summary card fed after all item cards of a respective group have been fed, said summary punch means punches the total of a number of items of the respective group of item cards on the summary card, said control means including a means movable to an operative position for manifesting an error when the group designation of the summary card does not agree with the group designation of the respective group of item cards; and manually operated selector means for inactivating said control means and for simultaneously effecting punching of blank summary cards fed by said summary card feeding means with group designations derived from said group control mechanism.

3. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means for punching totals of groups of items into summary cards; summary card feeding means for feeding summary cards to said summary punch means, each summary card being associated with one group of item cards; a group control mechanism for detecting a change in group designations of fed item cards, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; and control means including an analyzing device for said summary cards, said control means co-operating with said group control mechanism and controlling said summary punch means so that, upon agreement of the group designation of a group of fed item cards with the group designation of the summary card fed after all item cards of a respective group have been fed, said summary punch means punches the total of a number of items of the respective group of item cards on the summary card, said control means including deflector means for summary cards arranged between said summary card feed means and said summary card punch means and deflecting summary cards whose group designation does not agree with the group designation of the respective group of item cards.

4. Summary punch card arrangement as set forth in claim 3 comprising, in combination, a receiving pocket co-operating with said deflector means for receiving summary cards deflected by said deflector means.

5. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means and analyzer means for punching totals of groups of items into summary cards and for punching group designations into said summary cards; summary card feeding means for feeding summary cards to said summary punch means, each summary card being associated with one group of item cards; a group control mechanism for detecting a change in group designations of fed item cards, said group control mechanism including a storage device for storing the group designation of each group of item cards fed by said item card feeding means, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; and control means including an analyzing device for said summary cards, said control means co-operating with said group control mechanism and controlling said summary punch means so that, upon agreement of the group designation of a group of fed item cards stored in said storage device with the group designation of the summary card fed after all item cards of a respective group have been fed, said summary punch means punches the total of a number of items of the respective group of item cards on the summary card, said control means including a means movable to an operative position for manifesting an error when the group designation of the summary card does not agree with the group designation of the respective group of item cards, said control means effecting punching of the group designation by said summary punch means on a summary card only if there is no group designation already punched in the respective summary card.

6. Summary punch card arrangement comprising, in combination, item card feeding means for feeding groups of item cards having different group designations; accumulator means for totalizing items of groups of said item cards; analyzer means for said item cards and controlling said accumulator means; summary punch means controlled by said accumulator means for punching totals of groups of items into summary cards and for punching group designations into said summary cards, summary card feeding means for feeding summary cards to said summary punch means, each summary card being associated with one group of item cards; a group control mechanism for detecting a change in group designations of fed item cards, said group control mechanism including a storage device for storing the group designation of each group of item cards fed by said item card feeding means, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; and control means including an analyzing device for said summary cards, said analyzing device co-operating directly with said storage device, said control means controlling said summary punch means so that, upon agreement of the group designation of a group of fed item cards stored in said storage device with the group designation of the summary card fed after all item cards of a respective group have been fed, said summary punch means punches the total of a number of items of the respective group of item cards on the summary card, said control means including a means movable to an operative position for manifesting an error when the group designation of the summary card does not agree with the group designation of the respective group of item cards, said control means effecting punching of the group designation by said summary punch means on a summary card only if there is no group designation already punched in the respective summary card.

7. Summary punch card arrangement as set forth in claim 6 and including means for resetting said accumulator means and said storage device.

8. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means for punching totals of groups of items into summary cards and for punching group designations into said summary cards; summary card feeding means for feeding summary cards to said summary punch means, each summary card being associated with one group of item cards; a group control mechanism for detecting a change in group designations of fed item cards, said group control device actuating upon a group designation change of fed item cards said summary card feeding means to feed summary cards to said summary punch means while stopping said item card feeding means, and actuating said item card feeding means while stopping said summary card feeding means upon punching of a summary card by said summary punch means, and control means including an analyzing device for said summary cards, said control means co-operating with said group control mechanism and controlling said summary punch means so that, only upon agreement of the group designation of a group of fed item cards stored in said storage device with the group designation of the summary card fed after all item cards of a respective group have been fed, said summary punch means punches the total of a number of items of the respective group of item cards on the summary card, said control means effecting punching of the group designation by said summary card punch means on a summary card if there is no group designation already punched in the respective summary card.

9. Summary punch card arrangement comprising, in combination, item card feeding means for feeding groups of item cards having different group designations; accumulator means for totalizing items in each group of said item cards; analyzer means for said item cards and controlling said accumulator means; summary punch means controlled by said accumulator means and for punching totals of groups of items into summary cards and for punching group designations into said summary cards; summary card feeding means for feeding summary cards to said summary punch means, each summary card being associated with one group of item cards; a group control mechanism for detecting a change in group designations of fed item cards, said group control mechanism actuating upon a group designation change of fed item cards said summary card feeding means to feed summary cards to said summary punch means while stopping said item card feeding means, and actuating said item card feeding means while stopping said summary card feeding means upon punching of a summary card by said summary punch means; and control means including an analyzing device for said summary cards and a comparsion device co-operating with said group control mechanism and controlling said summary punch means so that, upon agreement of the group designation of a group of fed item cards with the group designation of the summary card fed after all item cards of a respective group have been fed, said summary punch means punches the total of a number of items of the respective group of item cards on the summary card, said control means including a means movable to an operative position for manifesting an error when the group designation of the summary card does not agree with the group designation of the respective group of item cards, said control means effecting punching of the group designation by said summary punch means on a summary card only if there is no group designation already punched in the respective summary card.

10. In a summary card punch arrangement, in combination, item card feeding means for feeding groups of item cards having different group designations; accumulator means for totalizing items in each group of item cards; first summary punch means controlled by said accumulator means for punching totals of groups of items into summary cards; second summary punch means for punching group designations derived from said group of item cards into said summary cards; summary card feeding means for feeding summary cards; a comparison device for comparing the group designation field on each summary card with the group designation derived from the respective group of item cards; and means for setting the machine either to punch the group designation on each summary card belonging to a group of item cards or for comparing the summary card and the group of item cards as regards the group designation.

11. In a summary card punch arrangement, in combination, item card feeding means for feeding groups of item cards having different group designations; accumulator means for totalizing items in each group of item cards; first summary punch means controlled by said accumulator means for punching totals of groups of items into summary cards; second summary punch means for punching group designations derived from said group of item cards into said summary cards; summary card feeding means for feeding summary cards; comparing means for comparing the group designation field on each summary card with the group designation derived from the respective group of item cards; and means for setting the machine either to punch the group designation on each summary card belonging to a group of item cards or for comparing the summary card and the group of item cards as regards the group designation, said setting means being under the control of said comparison device to cause punching of the group designation into the summary card if the designation field of the latter is not punched and to detect agreement or disagreement in the designation field if the summary card is already punched.

12. Summary card punch arrangement, comprising in combination, item card feeding means for feeding groups of items cards having different group designations; accumulator means for totalizing items in each group of said item cards; analyzer means for said item cards controlling said accumulator means; first summary punch means controlled by said accumulator means for punching totals of groups of items into said summary cards; second summary punch means for punching group designations derived from said group of item cards into said summary cards; a comparison device for comparing the group designation field on each summary card with the group designation derived from the respective group of item cards by said analyzer means; summary card feeding means for feeding summary cards to said first and second summary punch means and to said comparison device; a group control mechanism for detecting a change in group designations of fed item cards and actuating upon a group designation change of fed item cards said summary card feeding means to feed summary cards to said first and second summary punch means and to said comparison device; setting means having a first condition for causing actuation of said first and second summary punch means during a first run of said item cards and summary cards so that said first summary punch means punches the total of a number of items of the respective group of item cards on each summary card, and said second summary punch means punches the respective group designation on said summary cards, said setting means being settable to a second condition at least during another run of said cards during which said comparison device compares the group designation produced during the first run in the summary cards and the group designation of the associated group of item cards, said setting means in said second condition causing punching in the respective summary card of a total of items of the associated group of item cards by said first summary punch means only upon agreement of the group designation of the group of item cards with the group designation of the respective summary card.

13. Summary card punch arrangement, comprising in combination, item card feeding means for feeding groups of items cards having different group designations; accumulator means for totalizing items in each group of said item cards; analyzer means for said item cards controlling said accumulator means; first summary punch means controlled by said accumulator means for punching totals of groups of items into said summary cards; second summary punch means for punching group designations derived from said group of item cards into said summary cards; a comparison device for comparing the group designation field on each summary card with the group designation derived from the respective group of item cards by said analyzer means; summary card feeding means for feeding summary cards to said first and second summary punch means and to said comparison device; a group control mechanism for detecting a change in group designations of fed item cards and actuating upon a group designation change of fed item cards said summary card feeding means to feed summary cards to said first and second summary punch means and to said comparison device; setting means having a first condition for causing actuation of said first and second summary punch means, said setting means being under the control of said comparison device to assume said first condition thereof if the designation field of the summary card is not punched so that said second summary punch means punches the respective group designation into blank summary cards during a first run of said item and summary cards and said first summary punch means punches the total of a number of items of the respective group of item cards on each summary card, said setting means being settable to a second condition during another run of said cards during which said comparison device compares the group designation produced during the first run in the summary cards and the group designation of the associated group of item cards, said setting means in said second condition causing punching in the respective summary cards of a total of items of the associated group of item cards by said first summary punch means only upon agreement of the group designation of the group of item cards with the group designation of the respective summary card.

14. Summary card punch arrangement, comprising in combination, item card feeding means for feeding groups of items cards having different group designations; accumulator means for totalizing items in each group of said item cards; analyzer means for said item cards controlling said accumulator means; first summary punch means controlled by said accumulator means for punching totals of groups of items into said summary cards; second summary punch means for punching group designations arrived from said group of item cards into said summary cards; a comparison device for comparing the group designation field on each summary card with the group designation derived from the respective group of item cards; summary card feeding means for feeding summary cards to said first and second summary punch means and to said comparison device; a group control mechanism for detecting a change in group designations of fed item cards and actuating upon a group designation change of fed item cards said summary card feeding means to feed summary cards to said first and second summary punch means and to said comparison device, said group control mechanism including a storage device for storing the group designation of each group of item cards fed by said item card feeding means, said comparison device comparing said group designation field of said summary cards with the group designations stored in said storing device; setting means having a first condition for causing actuation of said first and second summary punch means during a first run of said item cards and summary cards so that said first summary punch means punches the total of a number of items of the respective group of item cards on each summary card, and said second summary punch means punches the respective group designation on said summary cards, said setting means being settable to a second condition at least during another run of said cards during which said comparison device compares the group designation produced during the first run in the summary cards and the group designation of the associated group of item cards, said setting means in said second condition causing punching in the respective summary card of a total of items of the associated group of item cards by said first summary punch means only upon agreement of the group destion of the group of itme cards with the group designation of the respective summary card.

15. Summary card punch arrangement, comprising in combination, item card feeding means for feeding groups of items cards having different group designations; accumulator means for totalizing items in each group of said item cards; analyzer means for said item cards controlling said accumulator means; first summary punch means controlled by said accumulator means for punching totals of groups of items into said summary cards; second summary punch means for punching group designations derived from said group of item cards into said summary cards; a comparison device for comparing the group designation field on each summary card with the group designation derived from the respective group of item cards; summary card feeding means for feeding summary cards to said first and second summary punch means and to said comparison device; a group control mechanism for detecting a change in group designations of fed item cards and actuating upon a group designation change of fed item cards said summary card feeding means to feed summary cards to said first and second summary punch means and to said comparison device, said group control mechanism including a storage device for storing the group designation of each group of item cards fed by said item card feeding means, said comparison device comparing said group designation field of said summary cards with the group designations stored in said storing device; setting means having a first condition for causing actuation of said first and second summary punch means, said setting means being under the control of said comparison device to assume said first condition thereof if the designation field of the summary card is not punched so that said second summary punch means punches the respective group designation into blank summary cards during a first run of said item and summary cards and said first summary punch means punches the total of a number of items of the respective group of item cards on each summary card, said setting means being settable to a second condition during another run of said cards during which said comparison device compares the group designation produced during the first run in the summary cards and the group designation of the associated group of item cards, said setting means in said second condition causing punching in the respective summary card of a total of items of the associated group of item cards by said first summary punch means only upon agreement of the group designation of the group of item cards with the group designation of the respective summary card.

References Cited in the file of this patent

UNITED STATES PATENTS

| | | |
|---|---|---|
| 2,062,118 | Bryce et al. | Nov. 24, 1936 |
| 2,126,595 | Weinlich et al. | Aug. 9, 1938 |
| 2,211,094 | Braun | Aug. 13, 1940 |